W. S. WATSON.
WHEEL RIM.
APPLICATION FILED MAR. 14, 1917.
1,259,814. Patented Mar. 19, 1918.
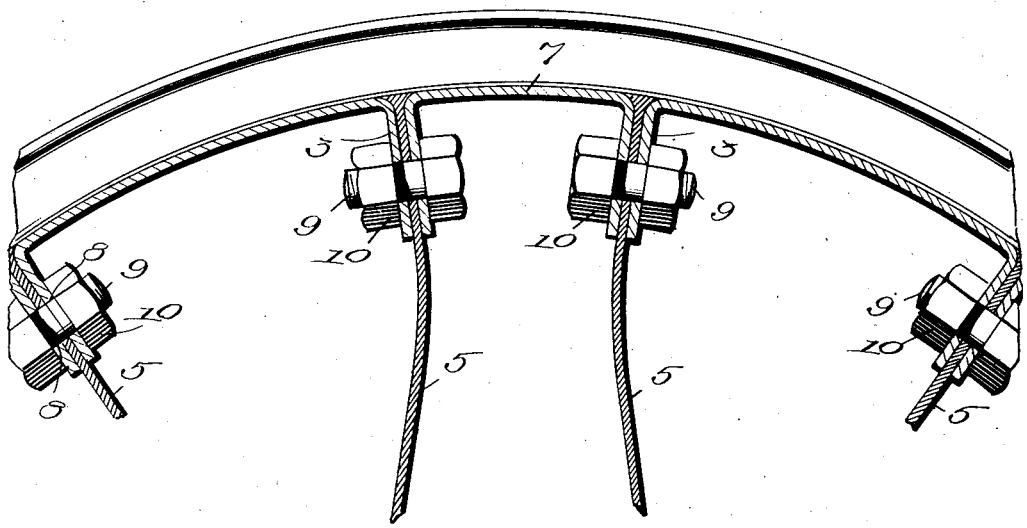
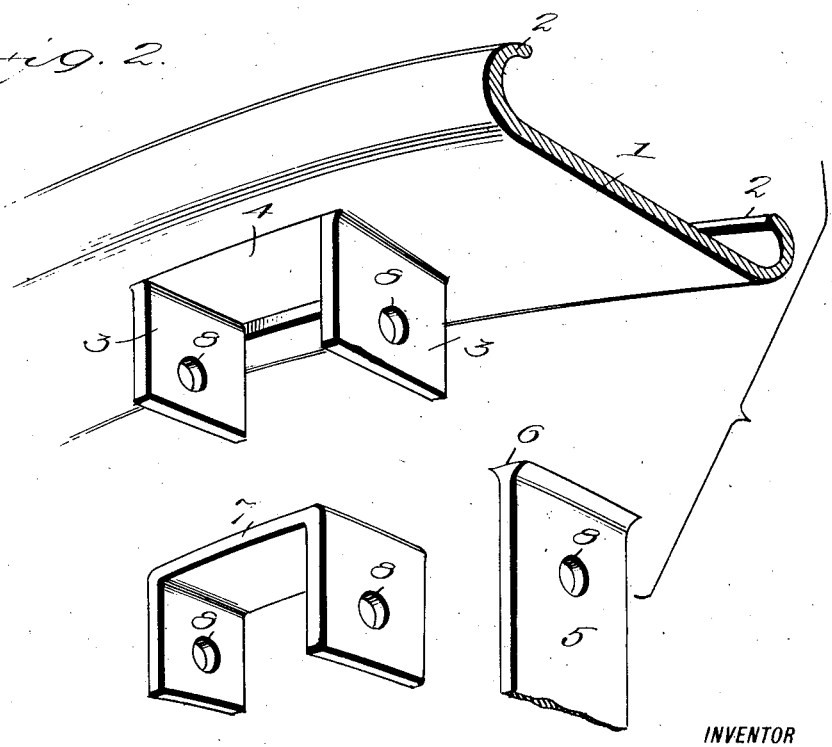
WITNESSES
INVENTOR
Winfield S. Watson
BY
ATTORNEYS

UNITED STATES PATENT OFFICE.

WINFIELD S. WATSON, OF CLEVELAND, OHIO.

WHEEL-RIM.

1,259,814.

Specification of Letters Patent.

Patented Mar. 19, 1918.

Application filed March 14, 1917. Serial No. 154,769.

*To all whom it may concern:*

Be it known that I, WINFIELD S. WATSON, a citizen of the United States, and a resident of Cleveland, in the county of Cuyahoga and State of Ohio, have invented a certain new and useful Improvement in Wheel-Rims, of which the following is a specification.

My invention relates to improvements in rim constructions, and it consists in the combinations and arrangements herein described and claimed.

An object of my invention is to provide an improved means for securing metal spokes to steel rims, such as those disclosed in my prior Patent, Number 1,162,670, dated November 30, 1915.

A further object of my invention is to provide a construction in which the cost of production is reduced to a minimum without sacrificing any of the strength or rigidity of the connections.

A further object of my invention is to provide a construction by means of which the parts may be assembled by unskilled labor.

A further object of my invention is to provide a rim having connections for metal spokes which dispenses with the necessity of riveting or welding any of the connecting parts to the rim.

Other objects and advantages will appear in the following specification, and the novel features of the invention will be particularly pointed out in the appended claims.

My invention is illustrated in the accompanying drawings forming a part of this application, and in which:

Figure 1 is a sectional view of a portion of a wheel rim constructed according to my invention;

Fig. 2 is a perspective view showing a portion of a rim and a spoke together with the connecting part, these parts being in position to be assembled.

In carrying out my invention I make use of the ordinary wheel rim, which rim may be of any suitable shape, that is to say, it may be of the so-called quick detachable or the clencher type, or any other type. In the drawing I have shown a rim of a form to be used with clencher types.

In the drawing 1 denotes the body portion of the rim, which has curved flanges 2. At equal distances apart ears 3 are punched from the rim, so as to lie substantially at right angles to the latter, as shown in the drawing. The spaces or openings 4 which are left by punching the ears 3 are utilized for securing the spokes 5. The latter, as will be seen from Fig. 2, are preferably upset at their ends, so as to flare outwardly, as shown at 6. The spokes are preferably arranged in pairs, the members of each pair being curved in opposite directions, as shown in Fig. 1, the purpose of the curvature being fully set forth in the prior patent aforesaid, and forming no feature of the present invention.

The spokes 5 are disposed contiguous to the ears 3, and a U-shaped plate 7 is disposed between the spokes 5 in a manner clearly shown in the drawing. The ears 3 of the end portions of the U-shaped plates 7 are provided with registering openings 8, and the spokes 5 also have registering openings 8 arranged to receive bolts 9 which are provided with nuts 10.

From the foregoing description of the various parts of the device, the operation thereof may be readily understood. All that is needed in the assembling of the parts is to place the spokes in position, put in the filler, and pass the bolts through the registering openings and then tighten up on the nuts. This will draw the parts together so that the opening left by the punched ears 3 will be substantially filled by the plate 7, and by the expanded end portion 6 of the spokes 5.

This construction avoids the necessity of riveting or welding any of the connecting parts to the rim. It provides a rim that is light and allows for interchangeability of the spoke connections, since any spoke may be moved and interchanged with any other spoke. It will be observed that these spokes are symmetrical and that by turning a spoke around it can be used for either one of a particular pair. This construction provides frictionless spoke connections which strengthen the rim and add to its rigidity. The parts are simple and durable, and, as stated, can be readily assembled at small cost.

The construction described may be used to provide fellies for demountable rims, with spoke connections that adapt them to suspension wheels or other wheels of automobiles and trucks using flat metal spokes, for it will be observed that the form of the spoke is not material, it being only essential that the end of the spoke be flat so as to fit closely between the ears 3 and the filler portion 7.

Another advantage secured by this device is that it provides a spoke connection which does not distort or weaken the rim but which, on the other hand, tends to strengthen it.

I claim:

1. The combination of a metal rim having a pair of opposed substantially flat radial ears punched therefrom, metal spokes having substantially flat ends, said spokes being arranged in pairs, one spoke of each pair being contiguous to one of said ears, and a U-shaped metal filler having a portion extending into the opening left by the punched ears, the end portions being in engagement with the opposed spokes, and means for securing each spoke to the contiguous ear and to the end of the U-shaped filler adjacent to it.

2. The combination of a metal rim having a pair of opposed substantially flat radial ears punched therefrom, metal spokes having substantially flat ends, said spokes being arranged in pairs, one spoke of each pair being contiguous to one of said ears, a U-shaped metal filler having a portion extending into the opening left by the punched ears, the end portions being in engagement with the opposed spokes, each of said spokes and the adjacent ear and filler portion having registering openings, a bolt arranged to pass through the registering openings, and a nut for tightening the bolt.

3. The combination of a metal rim having a pair of opposed substantially flat ears punched therefrom toward the center of the rim, a U-shaped filler disposed between said ears, the body of the filler entering the opening left by the punched ears, and being flush with the edges of the rim contiguous to the opening, a flat metal spoke disposed between each ear and adjacent the filler portion, each of said spokes being upset and expanded at its end to fill the space between the ears and the main body of the filler, and means for securing the spokes to the contiguous ear and filler portion.

WINFIELD S. WATSON.